United States Patent
Rasmusson et al.

(10) Patent No.: US 10,323,877 B2
(45) Date of Patent: Jun. 18, 2019

(54) KEG MANAGEMENT SYSTEM FOR WALK-IN REFRIGERATORS

(71) Applicant: Half Barrel Solutions, LLC, West Hartford, CT (US)

(72) Inventors: Loren D. Rasmusson, River Falls, WI (US); Michael D. Carroll, West Hartford, CT (US)

(73) Assignee: Half Barrell Solutions, LLC, West Hartford, CT (US)

( * ) Notice: Subject to any disclaimer, the term of this patent is extended or adjusted under 35 U.S.C. 154(b) by 0 days.

(21) Appl. No.: 15/844,565

(22) Filed: Dec. 17, 2017

(65) Prior Publication Data

US 2018/0187967 A1    Jul. 5, 2018

Related U.S. Application Data

(60) Provisional application No. 62/440,863, filed on Dec. 30, 2016.

(51) Int. Cl.
| | |
|---|---|
| *F25D 25/04* | (2006.01) |
| *F25D 13/00* | (2006.01) |
| *F25D 31/00* | (2006.01) |
| *F25D 25/02* | (2006.01) |

(Continued)

(52) U.S. Cl.
CPC ........... *F25D 25/04* (2013.01); *B65G 1/0457* (2013.01); *F25D 13/00* (2013.01); *F25D 13/06* (2013.01); *F25D 25/02* (2013.01); *F25D 31/006* (2013.01); *F25D 2201/126* (2013.01);

(Continued)

(58) Field of Classification Search
CPC ........ F25D 13/00; F25D 13/06; F25D 13/062; F25D 25/00; F25D 25/02; F25D 25/04; F25D 2201/126; F25D 2331/00
See application file for complete search history.

(56) References Cited

U.S. PATENT DOCUMENTS

| | | | |
|---|---|---|---|
| 1,696,138 A | 12/1928 | Day et al. | |
| 4,126,232 A * | 11/1978 | Orawiec | B66C 17/06 |
| | | | 212/312 |

(Continued)

FOREIGN PATENT DOCUMENTS

| | | |
|---|---|---|
| DE | 2811797 A1 | 9/1979 |
| GB | 2105294 A | 3/1983 |

(Continued)

OTHER PUBLICATIONS

Notification of Transmittal of the International Search Report and the Written Opinion of the International Searfching Authority, or the Declaration; PCT/US2014/060871; dated Feb. 4, 2015; 14 Pages.

*Primary Examiner* — Saul Rodriguez
*Assistant Examiner* — Ashley K Romano
(74) *Attorney, Agent, or Firm* — North Star IP Law PLLC; Edmund P. Anderson

(57) ABSTRACT

Handling and storage of beer kegs in walk-in coolers used in the food/beverage industry. The invention utilizes a track system with an electric hoist to lift and stack kegs anywhere within the defined beer cooler. The invention is designed to optimize the keg storage footprint and better organize keg rotation. With the optional digital scale, the end user can take the guess work out of calculating partial kegs for precise inventory control.

20 Claims, 12 Drawing Sheets

(51) Int. Cl.
*F25D 13/06* (2006.01)
*B65G 1/04* (2006.01)

(52) U.S. Cl.
CPC .. *F25D 2331/802* (2013.01); *F25D 2331/806* (2013.01); *F25D 2500/06* (2013.01)

(56) References Cited

U.S. PATENT DOCUMENTS

| | | | | |
|---|---|---|---|---|
| 4,813,224 | A * | 3/1989 | Blase | F16G 13/16 248/49 |
| 6,654,662 | B1 | 11/2003 | Hognaland | |
| 7,134,831 | B2 | 11/2006 | Risser | |
| 8,277,164 | B2 | 10/2012 | Huang et al. | |
| 9,220,181 | B2 * | 12/2015 | Edmundsson | H05K 7/2059 |
| 9,981,833 | B2 | 5/2018 | Carroll et al. | |
| 2003/0160547 | A1 * | 8/2003 | Desrochers | A47F 3/0486 312/116 |
| 2004/0060886 | A1 | 4/2004 | Windbergs | |
| 2005/0011202 | A1 * | 1/2005 | Voute | A01N 1/00 62/66 |
| 2005/0081932 | A1 | 4/2005 | Sari et al. | |
| 2008/0122189 | A1 | 5/2008 | Foppen | |
| 2011/0031254 | A1 * | 2/2011 | Mortarotti | B29C 44/1238 220/592.2 |
| 2012/0020763 | A1 | 1/2012 | Kuramoto | |
| 2012/0060541 | A1 * | 3/2012 | Hunt | A01N 1/0236 62/373 |
| 2013/0278121 | A1 * | 10/2013 | Shimada | F24F 13/32 312/236 |
| 2014/0377041 | A1 * | 12/2014 | Humphreys | F25D 25/04 414/278 |
| 2015/0104273 | A1 | 4/2015 | Van Kuilenburg et al. | |
| 2018/0023290 | A1 * | 1/2018 | Kinser, Jr. | E04B 1/6183 62/405 |
| 2018/0282133 | A1 | 10/2018 | Carroll | |

FOREIGN PATENT DOCUMENTS

| | | |
|---|---|---|
| GB | 2215695 A | 9/1989 |
| GB | 2417476 A | 3/2006 |
| WO | 9322157 A1 | 11/1993 |

* cited by examiner

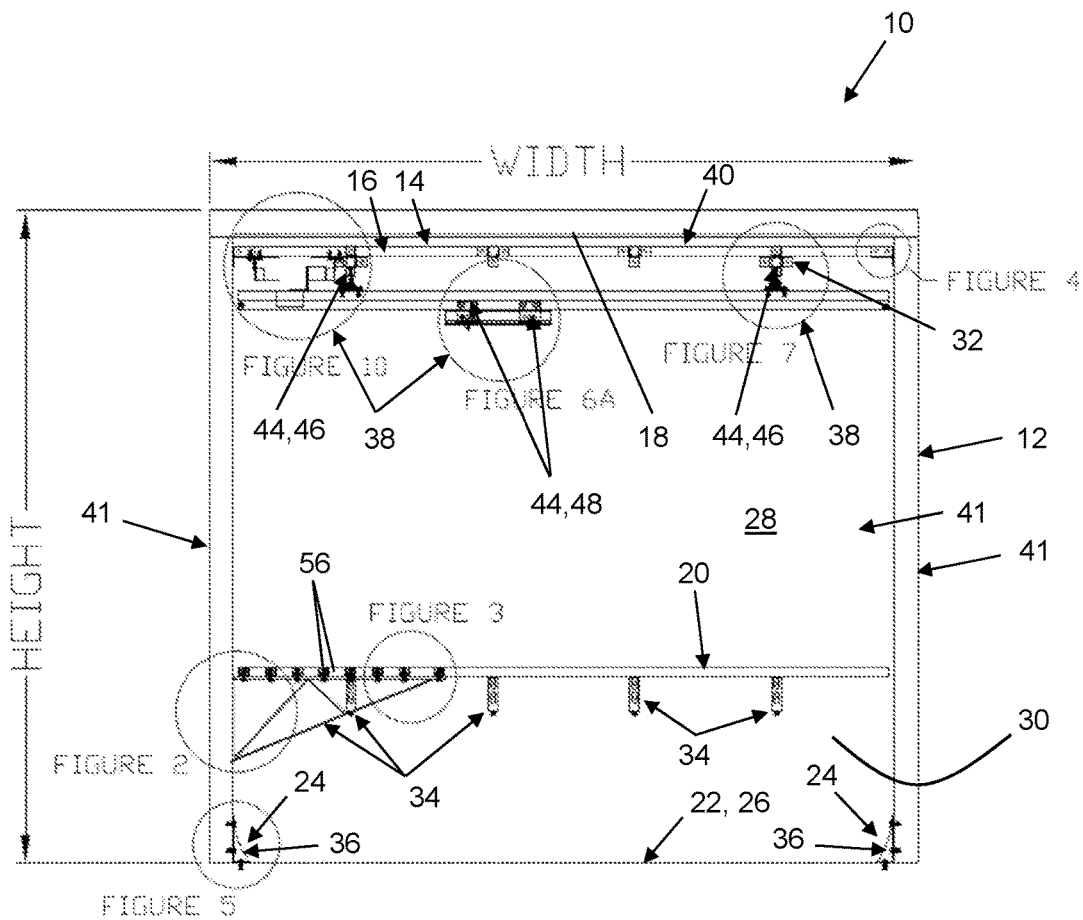
Elevation View 1

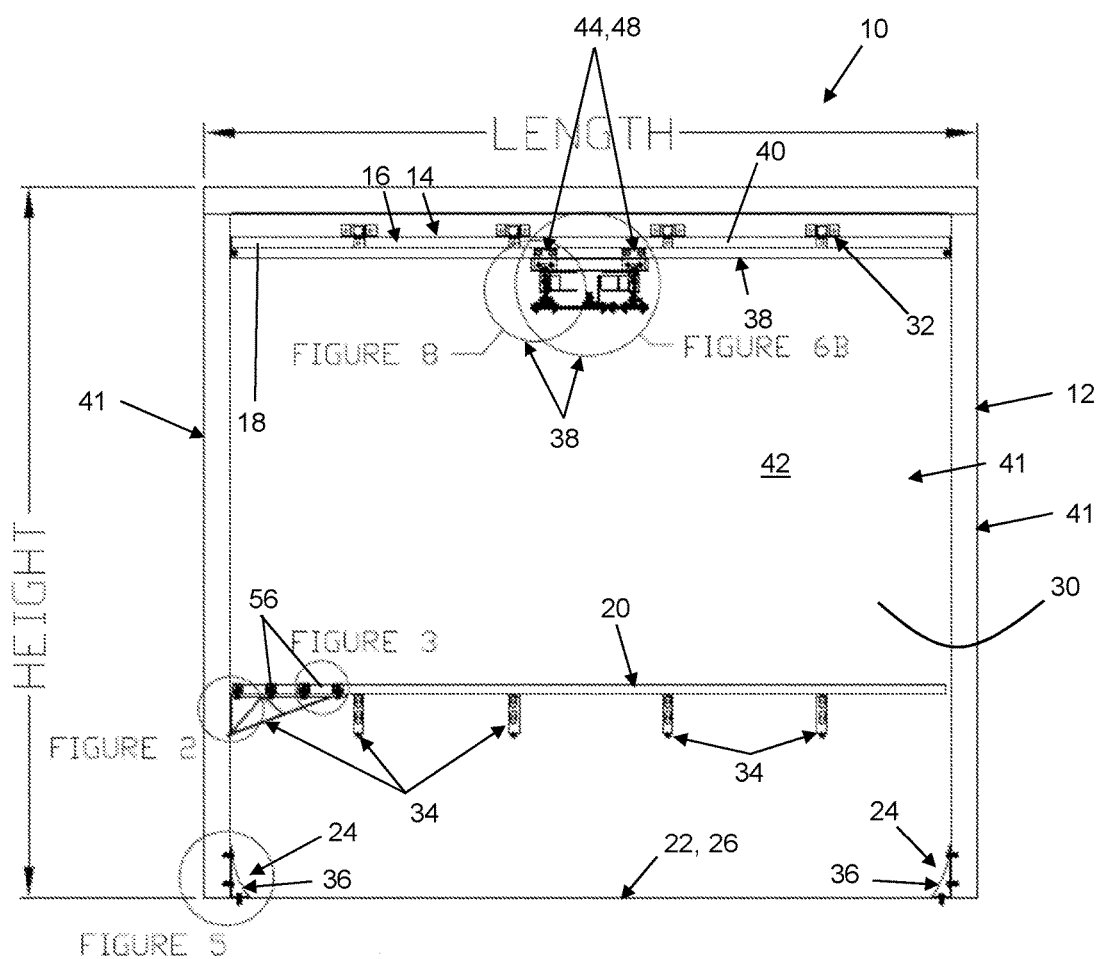
Elevation View 2

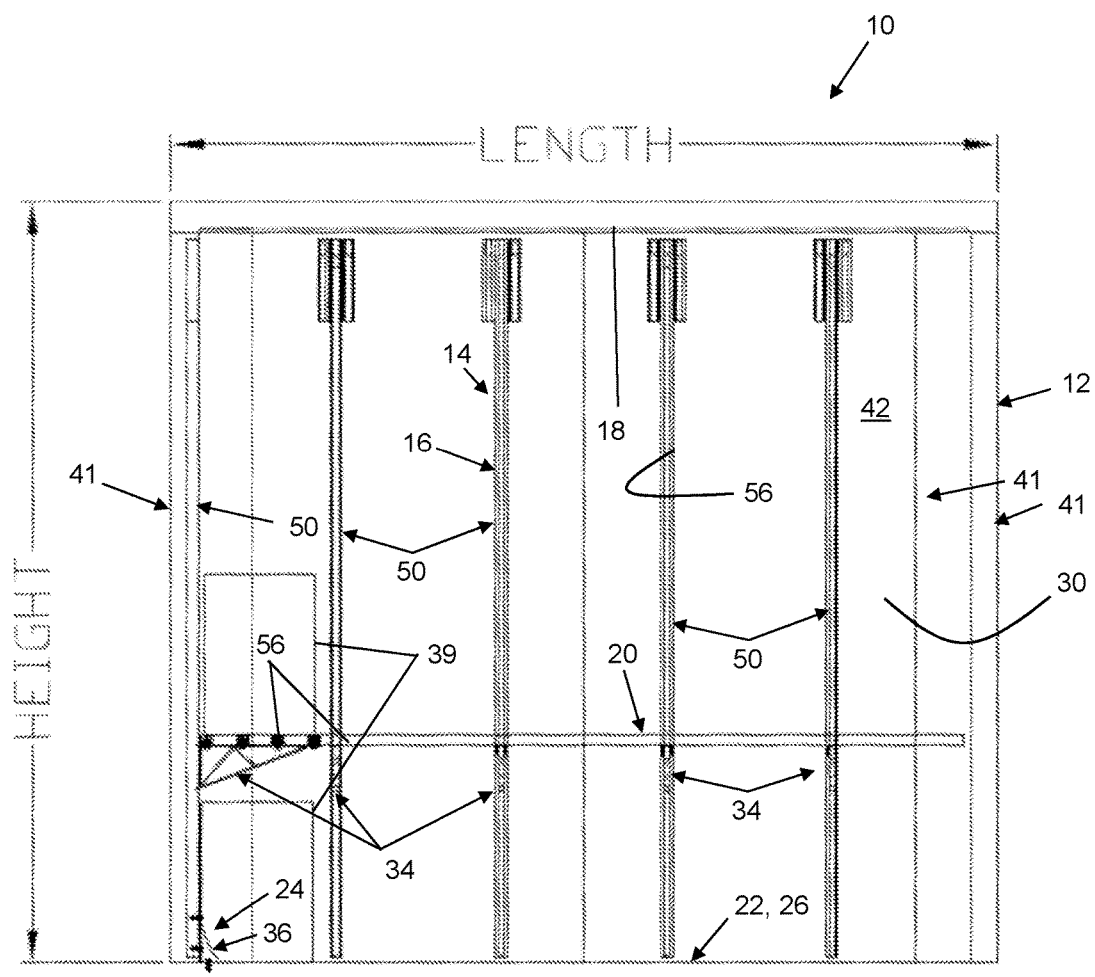
Elevation View 3

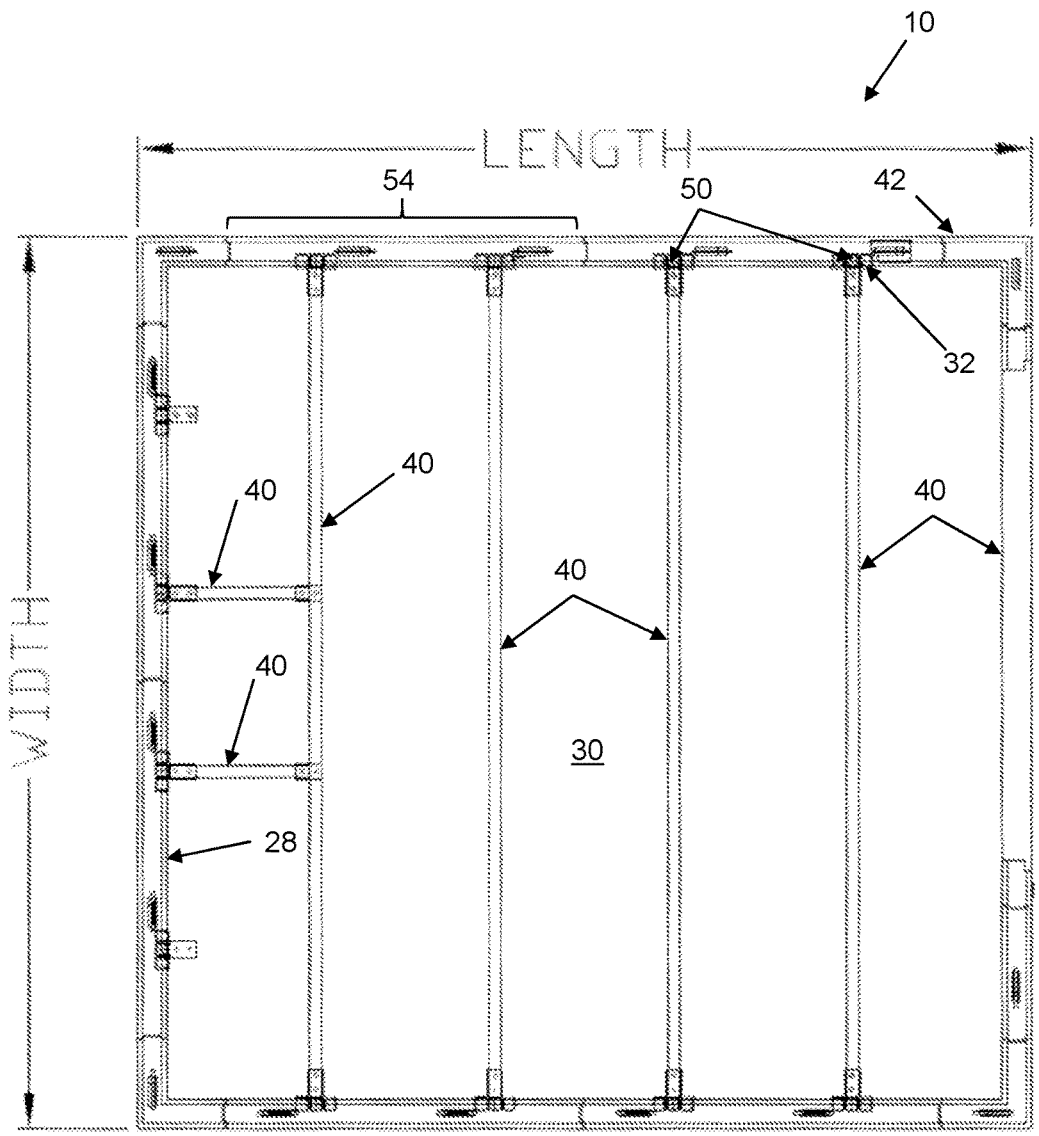
Plan View 1

KEG MANAGEMENT SYSTEM FOR WALK-IN REFRIGERATORS

CROSS REFERENCE TO RELATED APPLICATIONS

This application claims benefit of U.S. Provisional Application Ser. No. 62/440,863, filed Dec. 30, 2016, pursuant to 35 USC § 119(e).

FIELD OF THE INVENTION

This invention relates to the handling and storage of beer kegs in walk-in coolers used in the food/beverage industry. The integrated design utilizes a track system with an electric hoist to lift and stack kegs anywhere within a defined beer cooler. The Keg Management System, (KMS), is designed to optimize the keg storage footprint and better organize keg rotation. With the optional digital scale, the end user can take the guess work out of calculating partial kegs for precise inventory control.

Another component of this invention is the integrated cantilever shelving system. This system allows for more usable floor space by eliminating the shelf legs that would commonly rest on the walk-in floor. This translates into additional keg storage as well. The walk-in cooler ships from the factory with all the components pre-engineered further reducing installation costs. The KMS is configurable to virtually any size walk-in to fit the customers' needs, whether it's a Micro-Brewery or on a much larger scale.

BACKGROUND OF THE INVENTION

Currently, kegs are unloaded from the delivery trucks and wheeled to the walk-in cooler. Once there, the kegs are lifted and stacked manually by multiple people. The invention is designed to eliminate the physical requirements necessary for keg lifting, storage and inventory control. The KMS design is intended to be a one-person operation to provide additional labor savings. Half barrel kegs weigh approximately 165 lbs. With the rising cost of health care and work related back injuries, the design utilizes a track system with an electric hoist to lift and stack kegs anywhere within the beer cooler which is integrated into the Nor-Lake walk-in infrastructure.

SUMMARY OF THE INVENTION

It is an aspect of the invention to provide a system that will make handling and storing kegs practically effortless. This invention can reduce labor and eliminate back injuries associated with lifting kegs manually. Inventory management can now be precisely controlled with the addition of the digital scale.

It is another aspect of the invention to provide a shelving system that does not extend to the floor. This type of cantilever shelving system will provide additional floor space and make cleanup easier by providing an unobstructed floor surface.

BRIEF DESCRIPTION OF THE DRAWINGS

Elevation view 1 is a view looking at the back wall from the interior.

Elevation view 2 is a view looking at the right-side wall from the interior.

Elevation view 3 is a view looking at the right-side wall from the interior foamed-in-place channels.

Plan view 1 is a view of the cross-beam channels.

Figure 1:
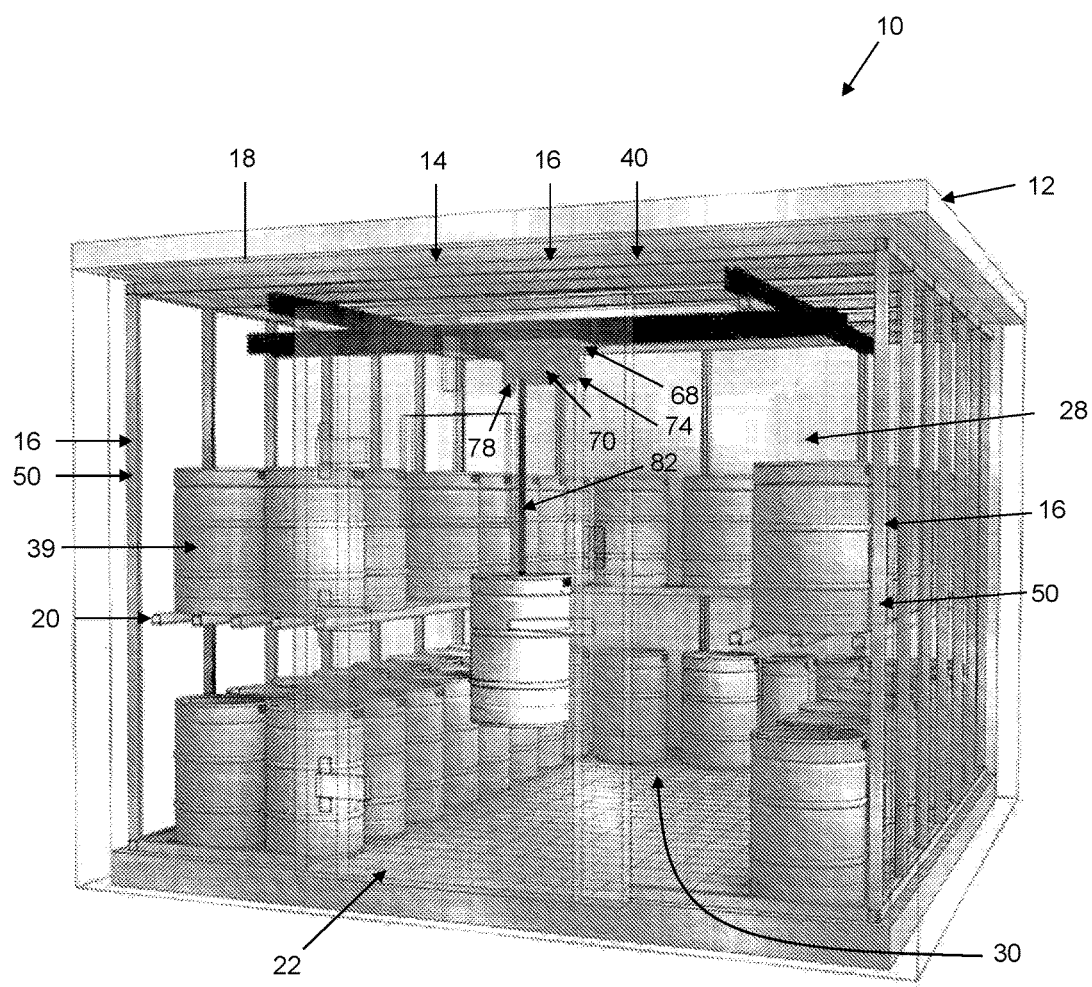

FIG. 1 is an isometric view of the walk-in cooler with the integrated KMS system shown with half barrel kegs.

Figure 2:
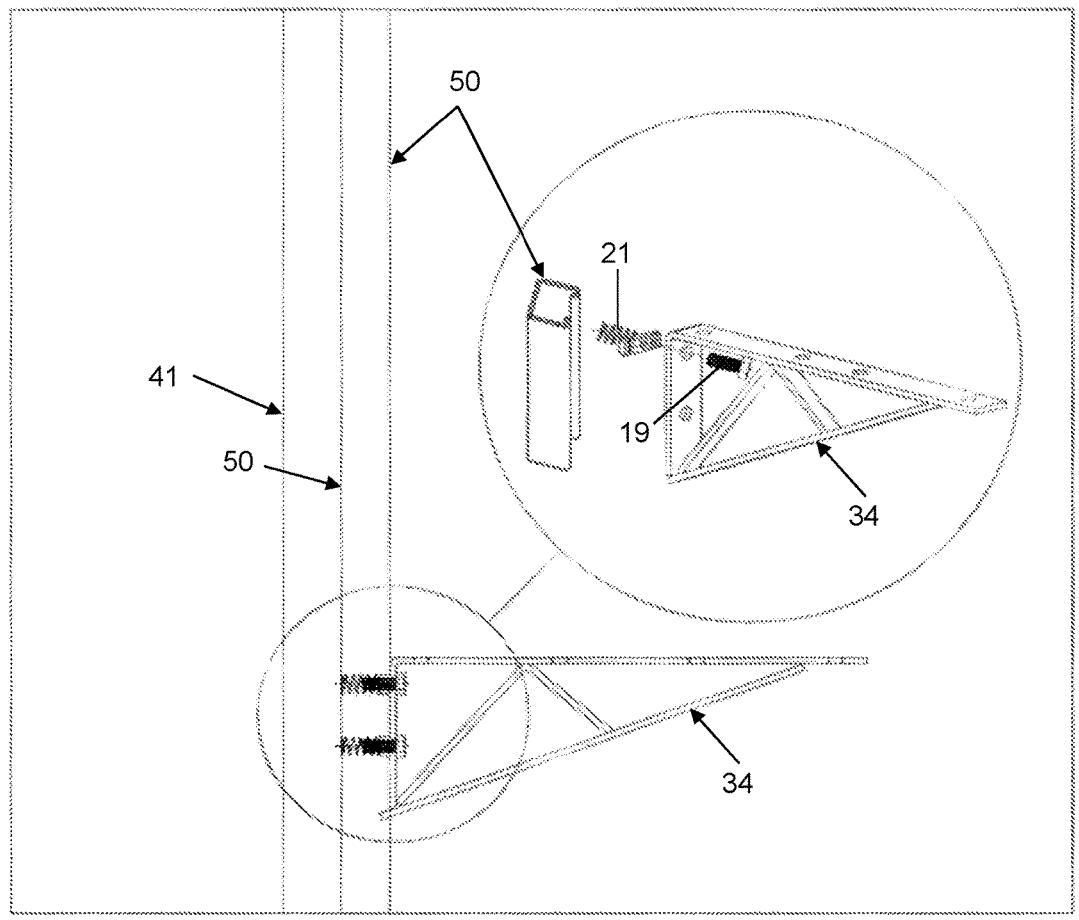

FIG. 2 is a cross sectional view of the shelf support bracket as they are attached to the vertical struts.

Figure 3:
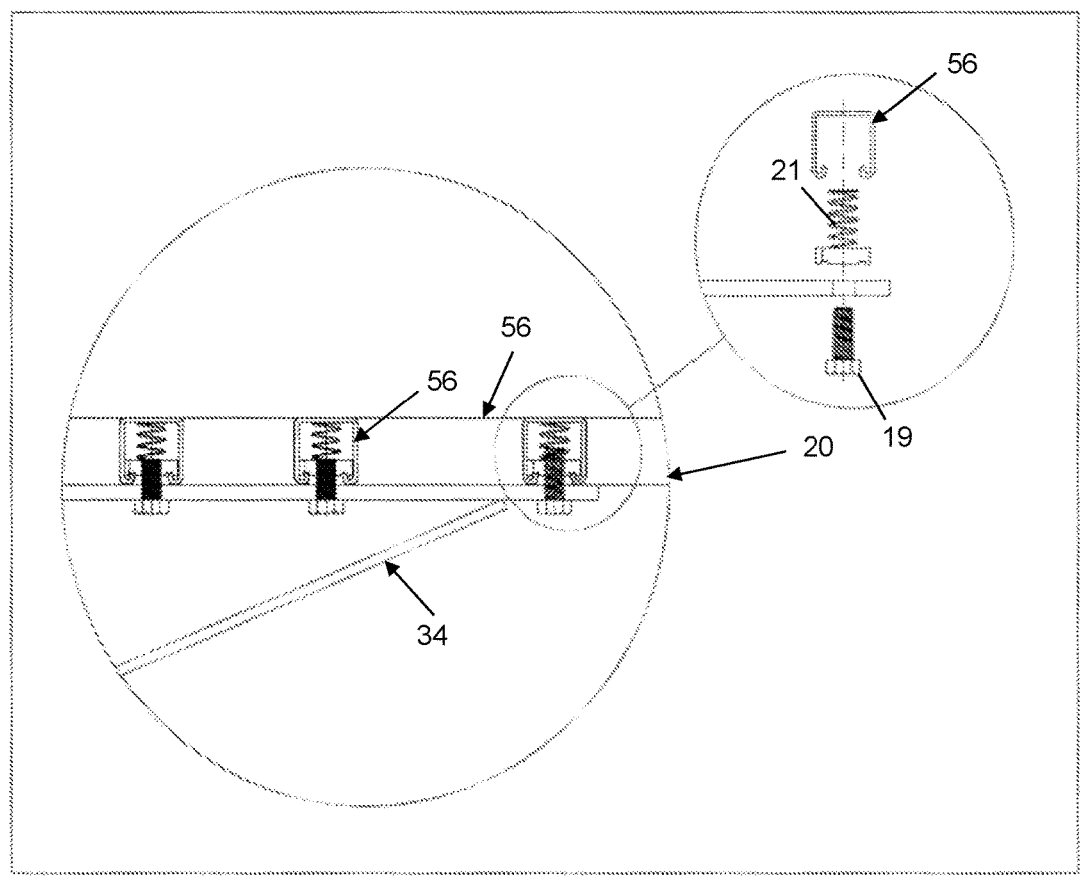

FIG. 3 is a detailed view of the shelf strut channels of the shelf as they attach to the shelf brackets.

Figure 4:
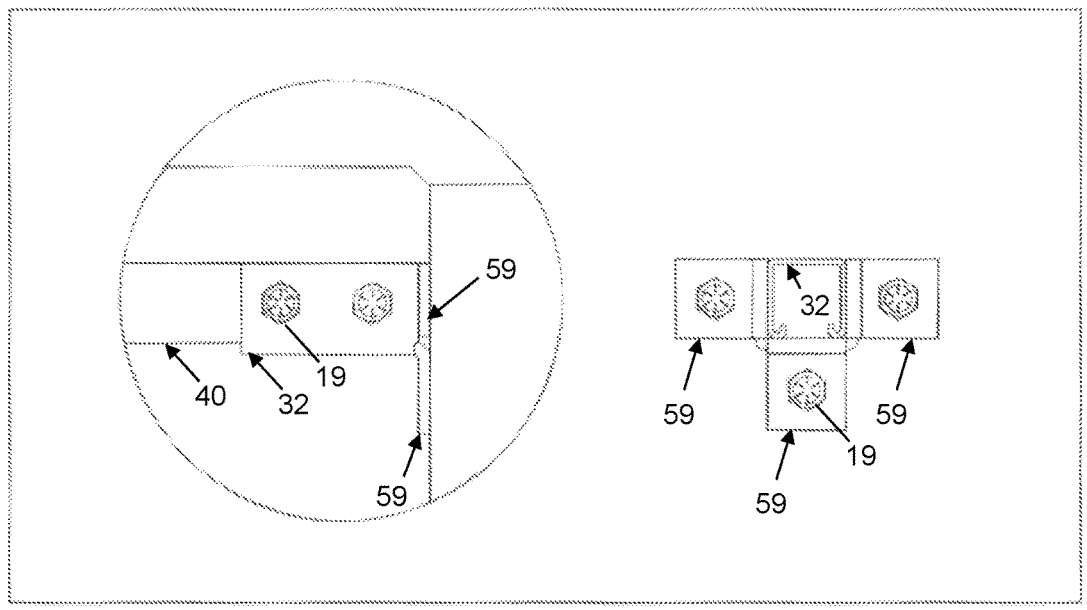

FIG. 4 is a cross sectional view of the horizontal ceiling strut channels used for the carriage assembly as they are attached to the vertical side wall strut channels.

Figure 5:
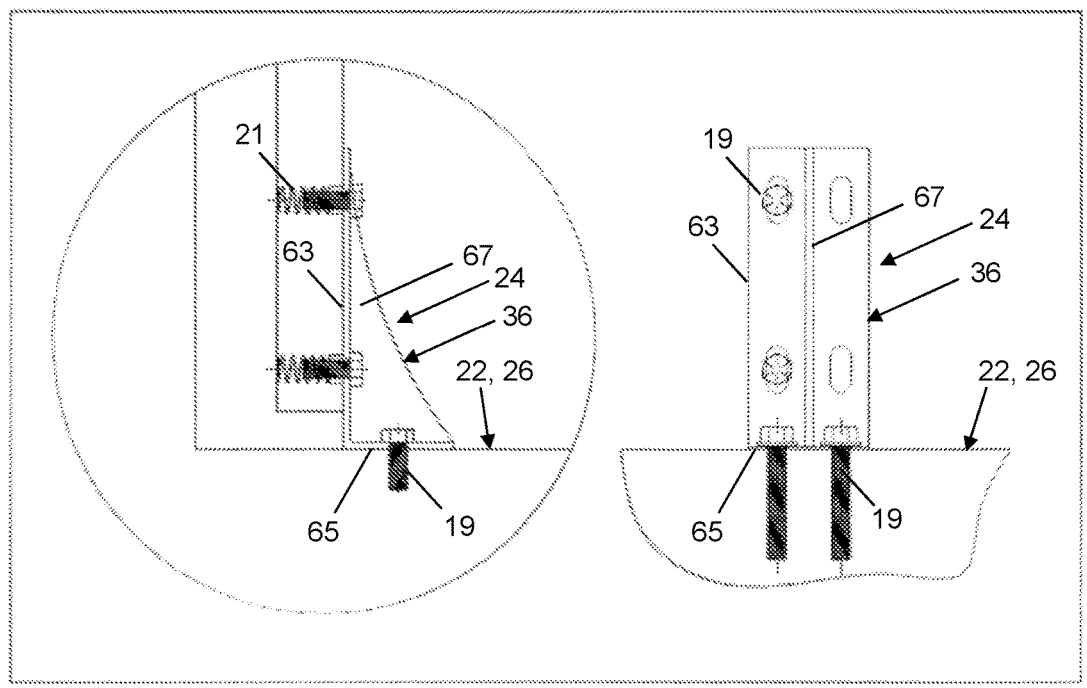

FIG. 5 is a cross sectional view of the floor anchors used to tie the vertical side wall strut channels to the cement pad for floorless applications.

Figure 6A:
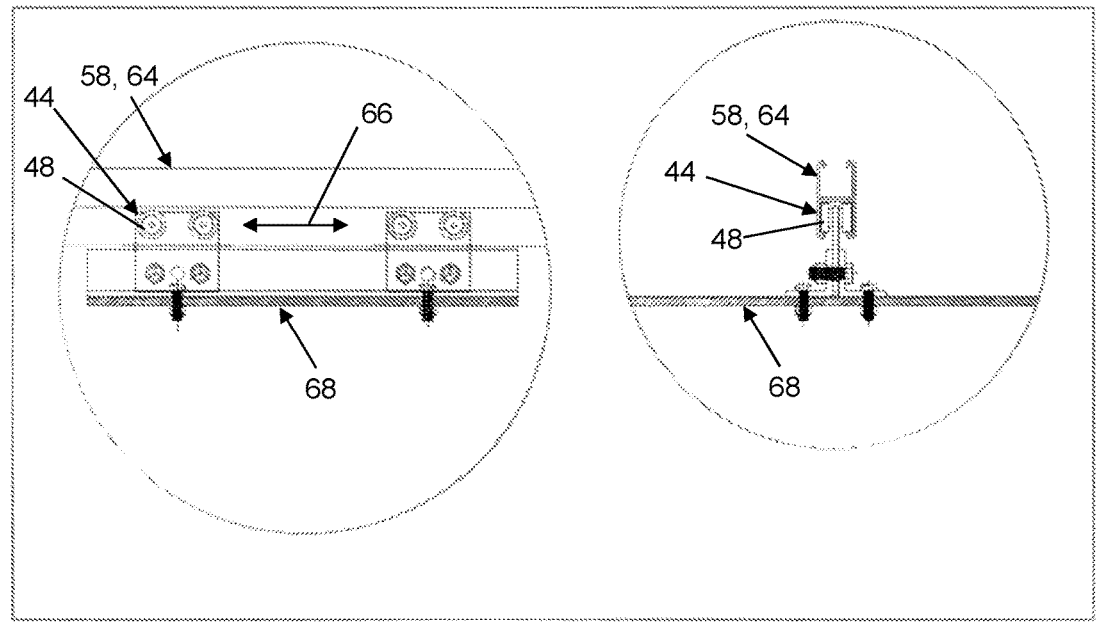
Figure 6B:
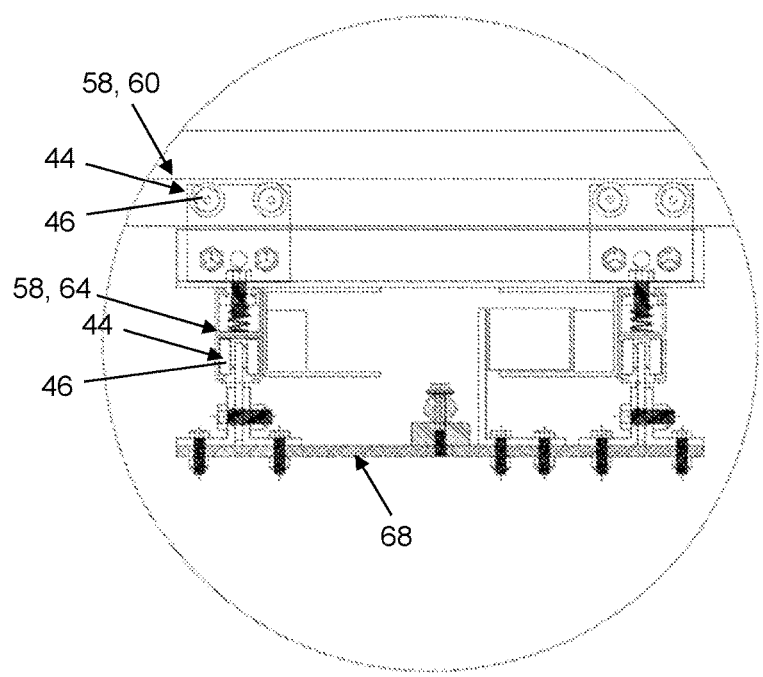

FIGS. 6A & 6B are detailed views of the carriage assembly which can travel in all four directions.

Figure 7:
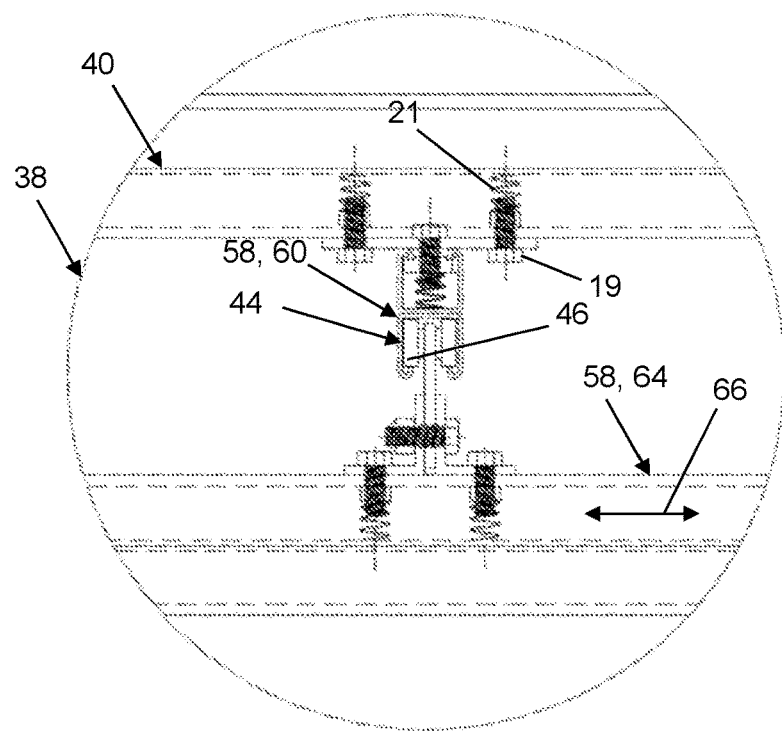

FIG. 7 is a detailed view of the carriage tracks and their relationship with the horizontal ceiling strut channels.

Figure 8:
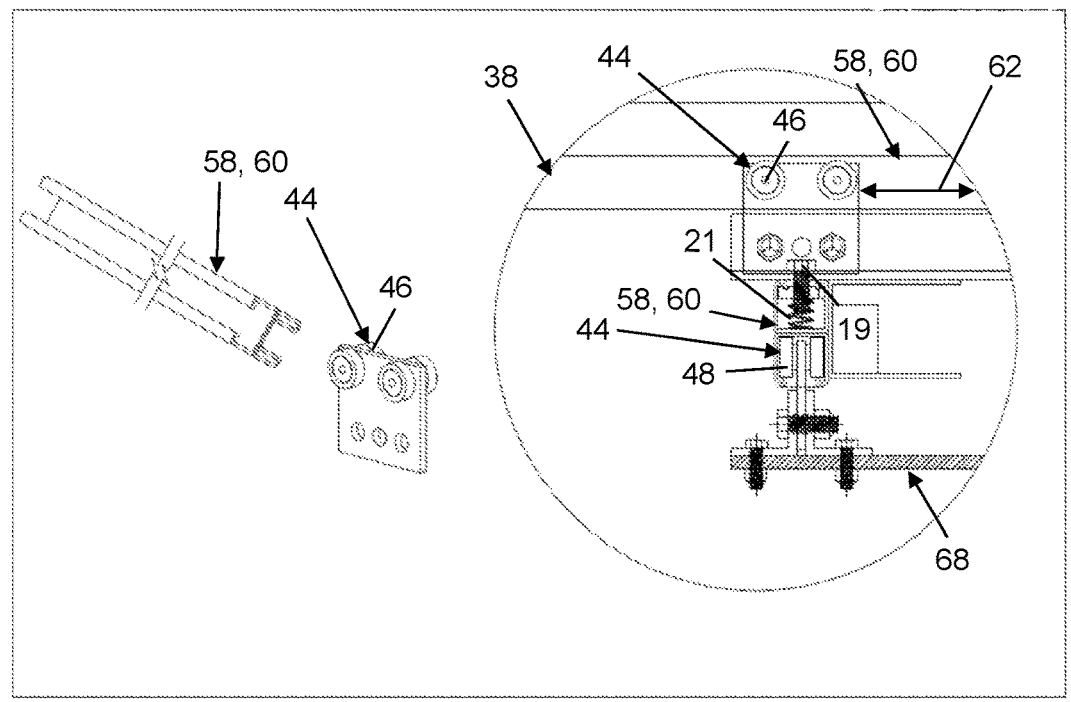

FIG. 8 is a detailed view of the first or upper roller bearings and and second or lower roller bearing of the roller bearing assembly in relationship to the carriage and horizontal strut.

Figure 9A:
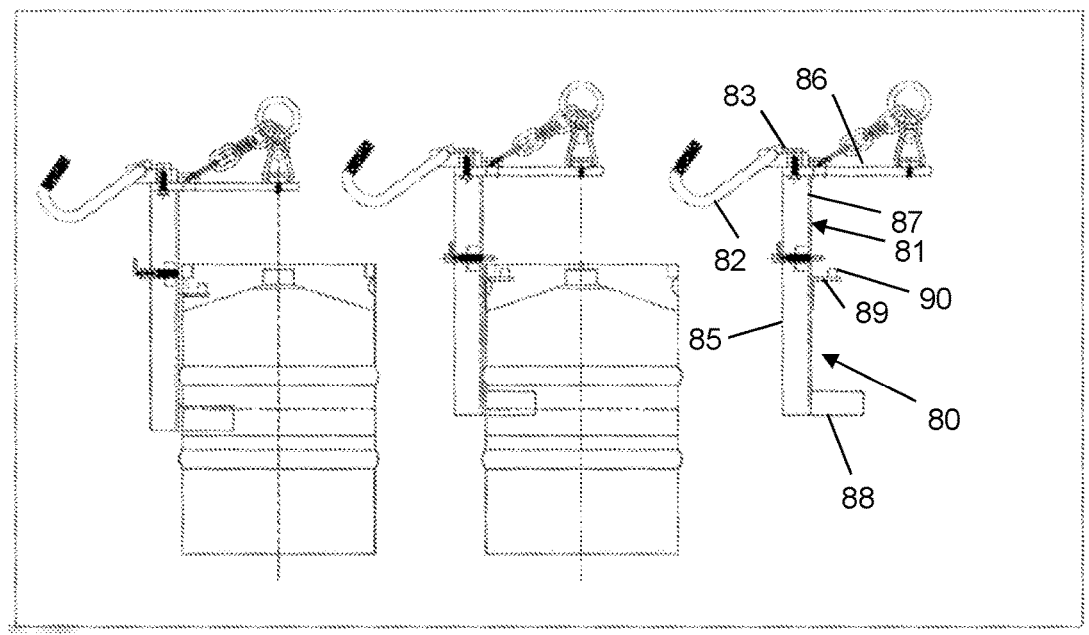
Figure 9B:
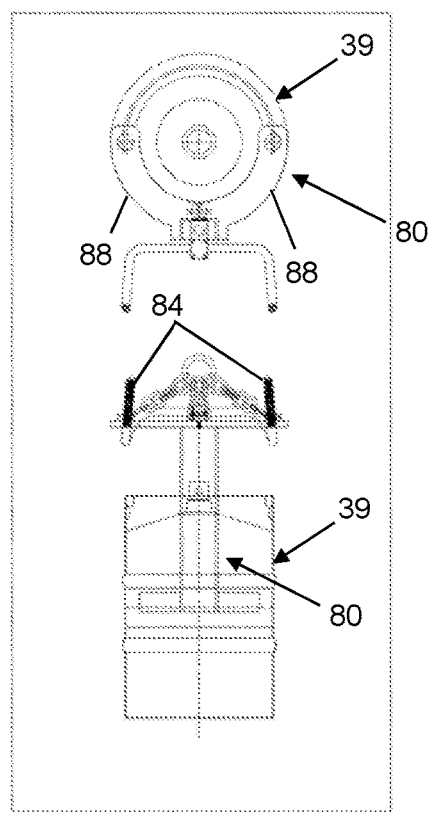

FIGS. 9A & 9B are detailed views of the guide handle with the control for the hoist and its relationship to the keg.

Figure 10:
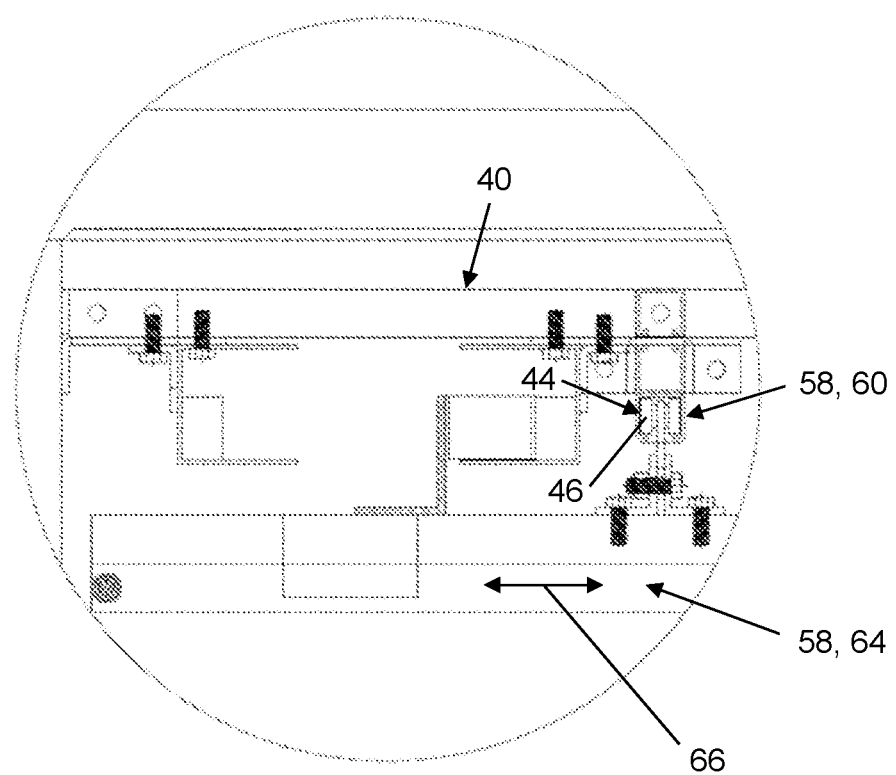

FIG. 10 is a detailed view of the track system used to run and shield the power cord.

DESCRIPTION OF THE EMBODIMENTS

Referring now to FIG. 1 where the invention, a keg or load management system 10 for loads such as beer kegs, is shown in combination with a walk-in cooler 12, such as a Nor-Lake beer cooler manufactured in Hudson, Wis. The keg management system 10 includes the framework 14 comprised of a steel strut 16 design that is bolted together by bolts 19 at the junctions of the ceiling 18, shelves 20, and floor 22.

FIG. 1 illustrates a walk-in cooler 10 with a super (raised) floor 22 but this invention is also offered in a version without the raised floor with floor anchor supports 24 attached to a cement pad 26 as the floor 22, as shown in Elevation view 2 and FIG. 5, for example. Either version provides a very rigid structure for overhead lifting and keg 39 storage.

Elevation view 1 is a view of an embodiment looking at the back wall 28 from the interior 30 to illustrate the connection points at the ceiling channel bracket 32, shelf brackets 34 and floor anchor brackets 36. This view also provides a general look of the carriage/track assembly 38 and its relationship with the horizontal ceiling strut channels 40.

Elevation view 2 is a view looking at the plurality of foamed-in-place cooler sidewalls 41, including right side wall 42 from the interior 30. This is another view of the carriage/track assembly 38 and carriage bearings 44, including first or upper carriage bearings 46 and second or lower carriage bearings 48, with relationship to the horizontal ceiling strut channels 40.

Elevation view 3 is a view of another embodiment at the right side wall 42 from the interior 30 illustrating the foamed-in-place vertical structural supports comprising vertical wall strut channels 50 and the relationship to the shelf brackets 34.

Plan view 1 is a view detailing the ceiling supports comprising horizontal ceiling strut channels 40 and their relationship to the integrated foamed-in-place vertical structural supports comprising vertical side wall strut channels 50 of Elevation view 3.

The vertical side wall strut channels 50 are foamed-in-place within the 4" thick walk-in wall panels and comprise foamed-in-place side wall panels 54. The walk-in wall panels that comprise foamed-in-place side wall panels 54 are locked together with a cam-lock/strike method most commonly used in the walk-in cooler industry. Once the walk-in wall panels are all locked together and the walk-in box is erected, the horizontal ceiling strut channels 40 are then bolted to the foamed in-place vertical side wall strut channels 50 as referenced in Elevation View 1 and FIG. 4 by a ceiling channel bracket 32. The ceiling channel bracket 32 has a horizontally extending, u-shaped pocket 53 comprising two opposed vertically extending legs 55 that are joined by a horizontally extending base 57 that is configured to receive a free end of the horizontal ceiling strut channels 40 and three attachment tabs 59, each one extending outwardly away from respective ones of the vertically extending legs 55 and horizontally extending base 57 and configured for attachment to the foamed-in-place side wall panels 54 and/or vertical side wall strut channels 50. As shown in FIG. 4, the ceiling channel bracket 32 may also be attached to the horizontal ceiling strut channel 40 with a bolted attachment using bolts 19 and spring-biased threaded member 21.

The floor anchor supports 24 are then bolted to the above mentioned vertical side wall strut channels 50 and anchored to the cement pad 26 as illustrated in FIG. 5 by a plurality of floor anchor brackets 36. The plurality of floor anchor brackets 36 comprising a vertical side 63, a horizontal side 65, and a tapered rib 67 extending between them. The floor anchor brackets 36 configured for attachment on said vertical side 63 to said vertical side wall strut channels 50 and on said horizontal side 65 to the floor 22. This completes the integrated keg or load management or support system necessary to carry the required load.

Next, the shelf supports comprising the shelf brackets 34 are then bolted to the vertical side wall strut channels 50 through cutouts 56 in the foamed-in-place side wall panels 54 as illustrated in FIG. 2. The horizontal shelving struts comprising shelf strut channels 56 are then bolted to the shelf brackets 34 as referenced in FIG. 3 forming the actual shelf 20. This procedure is repeated until all the shelving strut channels 56 are securely bolted to the 18" or 36" shelf brackets 34. The shelf bracket 34 size depends on the application.

The carriage tracks 58 are then bolted to the horizontal ceiling strut channels 40 as referenced in FIG. 7. Two sets of carriage tracks 58, including first or upper carriage tracks 60 extending in a first direction 62 and second or lower carriage tracks 64 extending in a second direction 66 and disposed orthogonally to the first or upper carriage tracks and first direction are utilized for the carriage/lift assembly 38, which enables it to travel in all four directions, including forward and backward or rearward in the first direction and forward and backward or rearward in the second direction 66, while evenly distributing the design load, such as a beer keg 39, about a vertical axis. Next the carriage roller bearing assembly 44, including first or upper carriage bearings 46 and second or lower carriage bearings 48, is slid into carriage tracks 58, including first or upper carriage tracks 60 and second or lower carriage tracks 64, respectively, as referenced in FIG. 8. Also reference FIGS. 6A & 6B for a detailed view of the carriage bearing assembly 44. The carriage 68 for hoist 70 can now be attached with the pivot pin to provide the carriage assembly 74.

Power is routed through aluminum channels 76 and protected by a plastic chain link system (not shown) specifically designed for this purpose as illustrated in FIG. 10. With this method, power is supplied in all four directions to the hoist 70 and LED light 78. It is critical to protect the power cord from pinch points and rough edges as the carriage travels to all parts of the walk-in cooler 12.

Once the carriage assembly 74 is complete, the optional keg handlebar guide 80 can then be attached to a hook (not shown) on the hoist chain 82.

Reference FIGS. 9A and 9B for detailed views of the keg handlebar guide 80. This device provides additional mobility and ease of use to the end user. The keg handlebar guide 80 comprises a vertical member 81, a handlebar 82 attached proximate an upper end 83 of the vertical member comprising a pair of spaced apart handles 84 protruding outwardly away from a first side 85 of the vertical member, an attachment plate 86 extending outwardly away from an opposed second side 87 of said vertical member proximate said upper end, a pair of opposed outwardly extending keg sidewall arms 88, such as curved keg sidewall arms 88, disposed proximate a lower end of said vertical member and extending outwardly away from said second side of said vertical member, and a protruding keg aperture arm 89 extending outwardly from said second side between the handlebar and curved arms and having an upwardly extending pin 90, and wherein the keg handlebar device is configured so that the protruding arm and pin may be inserted through an aperture of the keg and then lifted slightly so that the pin is configured to engage a portion of the keg proximate the aperture and the curved arms are configured to engage a sidewall of the keg so as to capture the keg within the keg handlebar guide.

Although the present invention has been described with reference to certain preferred embodiments thereof, other versions are readily apparent to those of ordinary skill in the preferred embodiments contained herein.

What is claimed is:

1. A keg or load management system for a walk-in cooler, comprising a plurality of side walls defining a length, width and height, and a top wall, said side walls formed from a plurality of foamed-in-place side wall panels that are configured to be locked together, said keg management system comprising:

a framework comprising a plurality of vertical side wall strut channels that are integrated into and disposed within said plurality of foamed-in-place side wall panels proximate a corresponding plurality of cutouts in said panels, and a plurality of horizontal ceiling strut channels, said vertical side wall strut channels and said horizontal ceiling strut channels configured for attachment to one another once said foamed-in-place side wall panels are locked together; and a first set of carriage tracks configured for attachment to said horizontal ceiling strut channels, a first set of carriage roller bearings configured to be movably disposed in said first set of carriage tracks for movement in a first direction;

a second set of carriage tracks disposed orthogonally to said first set of carriage tracks and configured for attachment to said first set of carriage roller bearings, a second set of carriage roller bearings configured to be movably disposed in said second set of carriage tracks for movement in a second direction orthogonal to the first; and a carriage lift assembly that is electrically powered, said carriage lift assembly comprising a carriage and an electrically powered hoist disposed on the carriage, said carriage configured to be attached to said second set of roller bearings, wherein said carriage lift assembly is configured to be moveable in the first and second directions and configured to lift and lower a load.

2. The keg or load management system of claim 1, wherein said carriage lift assembly further comprises a keg handlebar guide attached to the hoist.

3. The keg or load management system of claim 2, wherein said keg handlebar guide is configured to evenly distribute a load from a beer keg about a vertical axis of the beer keg.

4. The keg or load management system of claim 3, wherein said keg handlebar guide comprises a vertical member, a handlebar attached proximate an upper end of the vertical member comprising a pair of spaced apart handles protruding outwardly away from a first side of the vertical member, an attachment plate extending outwardly from an opposed second side of said vertical member proximate said upper end, a pair of opposed outwardly extending curved arms disposed proximate a lower end of said vertical member and extending outwardly away from said second side of said vertical member, and a protruding arm extending outwardly from said second side between the handlebar and curved arms and having an upwardly extending pin, and wherein the keg handlebar device is configured so that the protruding arm and pin may be inserted through an aperture of the keg and then lifted slightly so that the pin is configured to engage a portion of the keg proximate the aperture and the curved arms are configured to engage a sidewall of the keg so as to capture the keg within the keg handlebar device.

5. The keg or load management system of claim 2, wherein said keg handlebar guide comprises:
a vertical member;
a handlebar attached proximate an upper end of the vertical member comprising a pair of spaced apart handles protruding outwardly away from a first side of the vertical member;
an attachment plate extending outwardly away from an opposed second side of said vertical member proximate said upper end,
a pair of opposed outwardly extending keg sidewall arms disposed proximate a lower end of said vertical member and extending outwardly away from said second side of said vertical member; and
a protruding keg aperture arm extending outwardly from said second side between the handlebar and curved arms and having an upwardly extending pin, wherein the keg handlebar guide is configured so that the protruding arm and pin may be inserted through an aperture of the keg and then lifted slightly so that the pin is configured to engage a portion of the keg proximate the aperture and the keg sidewall arms are configured to engage a sidewall of the keg so as to capture the keg within the keg handlebar guide.

6. The keg or load management system of claim 1, further comprising channels attached to said framework to protect a power cord that is configured to provide electrical power to said electrically powered carriage lift assembly while it is moving throughout said cooler.

7. The keg or load management system of claim 1, further comprising a digital scale in communication with said carriage lift assembly such that the weight of a load being lifted can be determined.

8. The keg or load management system of claim 7, wherein the load comprises a beer keg.

9. The keg or load management system of claim 8, wherein the digital scale is configured to determine the weight of the keg.

10. The keg or load management system of claim 8, wherein the digital scale is configured to determine whether the beer keg is only partially filled.

11. The keg or load management system of claim 1, further comprising:
an integrated cantilever shelving system configured for storing a plurality of beer kegs thereon, said integrated cantilever shelving system comprising a plurality of shelf brackets configured for attachment to said vertical side wall strut channels and a shelf configured to be disposed on the shelf brackets.

12. The keg or load management system of claim 11, wherein the shelf comprises a plurality of shelf strut channels.

13. The keg or load management system of claim 11, wherein the plurality of shelving struts are configured for attachment to the plurality of shelf brackets by a plurality of bolts.

14. The keg or load management system of claim 11, wherein a filled beer keg can be placed in a predetermined location on said cantilevered shelf by a single operator.

15. The keg or load management system of claim 1, wherein said vertical side wall strut channels and said horizontal ceiling strut channels are configured for bolted attachment to one another.

16. The keg or load management system of claim 15, further comprising a plurality of ceiling channel brackets used to provide said bolted attachment, each ceiling channel bracket comprising a u-shaped pocket having two opposed vertically extending legs that are joined by a horizontally extending base and three attachment tabs extending outwardly away from respective ones of the vertically extending legs and horizontally extending base, said u-shaped channel bracket configured to capture a free end of one of the horizontal ceiling strut channels.

17. The keg or load management system of claim 1, further comprising a plurality of floor anchor brackets comprising a vertical side, a horizontal side, and a tapered rib extending between them, said floor anchor brackets configured for attachment on said vertical side to said vertical side wall strut channels and on said horizontal side to a floor.

18. The keg or load management system of claim 1, wherein said floor comprises a raised floor of the cooler or a concrete pad.

19. A keg or load management system for a walk-in cooler comprising a plurality of side walls and a top wall, said side walls comprising a plurality of foamed-in-place side wall panels that are configured to be locked together, said keg management system comprising:
a framework comprising a plurality of vertical side wall strut channels that are integrated into and disposed within said plurality of foamed-in-place side wall panels proximate a corresponding plurality of cutouts in said panels, and a plurality of horizontal ceiling strut channels disposed proximate the top wall, said vertical side wall strut channels and said horizontal ceiling strut channels configured for attachment to one another once said foamed-in-place side wall panels are locked together;
a first set of carriage tracks configured for attachment to said horizontal ceiling strut channels, a first set of carriage roller bearings configured to be movably disposed in said first set of carriage tracks for movement in a first direction;

a second set of carriage tracks disposed orthogonally to said first set of carriage tracks and configured for attachment to said first set of carriage roller bearings, a second set of carriage roller bearings configured to be movably disposed in said second set of carriage tracks for movement in a second direction orthogonal to the first;

a carriage lift assembly that is electrically powered, said carriage lift assembly comprising a carriage and an electrically powered hoist configured to be disposed on the carriage, said carriage configured to be attached to said second set of roller bearings, wherein said carriage lift assembly is configured to be moveable in the first and second directions and configured to lift and lower a load; and an integrated cantilever shelving system configured for storing a plurality of beer kegs thereon, said integrated cantilever shelving system comprising a plurality of shelf brackets configured for attachment to said vertical side wall strut channels and a shelf configured to be disposed on the shelf brackets.

20. A keg or load management system and walk-in cooler, comprising:

a walk-in cooler comprising a plurality of side walls and a top wall, said side walls comprising a plurality of foamed-in-place side wall panels that are configured to be locked together;

a keg management system comprising:

a framework comprising a plurality of vertical side wall strut channels that are integrated into and disposed within said plurality of foamed-in-place side wall panels proximate a corresponding plurality of cut-outs in said panels, and a plurality of horizontal ceiling strut channels disposed proximate the top wall, said vertical side wall strut channels and said horizontal ceiling strut channels configured for attachment to one another once said foamed-in-place side wall panels are locked together;

a first set of carriage tracks configured for attachment to said horizontal ceiling strut channels, a first set of carriage roller bearings configured to be movably disposed in said first set of carriage tracks for movement in a first direction;

a second set of carriage tracks disposed orthogonally to said first set of carriage tracks and configured for attachment to said first set of carriage roller bearings, a second set of carriage roller bearings configured to be movably disposed in said second set of carriage tracks for movement in a second direction orthogonal to the first; and a carriage lift assembly that is electrically powered, said carriage lift assembly comprising a carriage and an electrically powered hoist configured to be disposed on the carriage, said carriage configured to be attached to said second set of roller bearings, wherein said carriage lift assembly is configured to be moveable in the first and second directions and configured to lift and lower a load.

* * * * *